United States Patent Office 3,351,577
Patented Nov. 7, 1967

3,351,577
SOUND RECORD COMPRISING VINYL HALIDE RESIN, GROUP II METAL TALLATE AND HYDROGEN HALIDE ACCEPTOR
Stephen Krumm, Plainfield, N.J., assignor to Union Carbide Corporation, a corporation of New York
No Drawing. Filed Jan. 28, 1966, Ser. No. 523,556
10 Claims. (Cl. 260—23)

This application is a continuation-in-part of application Ser. No. 167,166 filed Jan. 18, 1962, now abandoned.

This invention relates to sound records produced from thermoplastic, vinyl halide resin compositions. More specifically this invention relates to thermoplastic, vinyl halide resin compositions which possess excellent heat stability, improved "moldability" and which have particular utility in the manufacture of sound records that are characterized by excellent audio properties and by excellent surface characteristics.

In the production of sound-record discs from vinyl halide resin compositions, the compositions are subjected to heat and pressure in compression molds wherein they are formed into discs of desired dimensions. Attendant with the relatively high temperatures at which vinyl halide resin compositions are formed into sound-record discs, however, is the problem of thermal deterioration of the resins. Thermal deterioration is initially manifested by a discoloration of the compositions which progresses through a yellow color to an orange color and finally to a black or brown color. When attaining a brown or black color, the resins have reached substantially complete deterioration and the physical properties of the resins and of the compositions containing these resins, for all practical purposes, have been completely degraded.

Deterioration of vinyl halide resins has been generally attributed to the resins inherent instability at relatively high temperatures due to dehydrohalogenation and subsequent oxidation. At relatively high temperatures, it is believed that hydrogen halide is eliminated from the resins and the hydrogen halide so split off, catalyzes an oxidative attack on the unsaturated linkages of the resins, the unsaturated linkages being formed as a result of the dehydrohalogenation.

The problem of thermal degradation becomes more acute when vinyl halide resins and compositions containing these resins are processed in apparatus which is made of iron. The hydrogen halide, eliminated from such resins at the relatively high temperatures at which such resins and resin compositions are being processed, reacts with the iron at the surface of the apparatus to form ferric halide. Ferric halide catalyzes the oxidative attack on the unsaturated linkages of the resin even more strongly than hydrogen halide.

The present invention provides thermoplastic, vinyl halide resin compositions which are not only characterized by excellent thermal stability when subjected to relatively high temperatures while under pressure but in addition can be stored for periods of time ranging up to several months without undergoing any discernible chemical or physical degradation. This is an important practical consideration for compositions, once formulated, are often stored for periods of time ranging up to months before being formed into shaped articles. In addition, the compositions of this invention are characterized by improved moldability. That is, truer reproductions of stampers can be effected by using the compositions of this invention. These compositions exhibit a maximum degree of conformity to the stampers by which they are formed into sound-record discs with the result that high quality sound reproduction discs are obtained. Furthermore, the compositions of this invention can be formed into high quality sound reproduction discs whose surfaces possess high gloss and are free from stains and streaks. The superior surface appearance of sound discs or records which possess high gloss and are free from stains and streaks, obviously makes such records aesthetically attractive.

The compositions of this invention comprise a thermoplastic, vinyl halide resin, a primary stabilizer for the thermoplastic, vinyl halide resin and a Group II metal tallate which serves as a secondary stabilizer.

The total amount of stabilizer, i.e. the total amount of primary stabilizer and secondary stabilizer, present in the compositions of this invention is generally from about 0.15 to about 9 percent by weight and preferably about 0.5 to about 6 percent by weight based on the weight of the thermoplastic vinyl halide resin with the secondary stabilizer being present in an amount of about 10 to about 50 percent by weight and preferably from about 25 to about 50 percent by weight, based on the weight of the stabilizers (both primary and secondary stabilizers) in the composition.

Group II metals of the Periodic Table, as set forth on pages 310–311 of Handbook of Chemistry and Physics, 30th Edition, are: beryllium, magnesium, calcium, zinc, strontium, cadmium, barium, mercury and radium.

The term vinyl halide resins as used herein is intended to encompass, among others, homopolymers of a monomer having the formula:

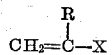

wherein X is a halogen atom, e.g., chlorine, bromine, iodine or fluorine and R is hydrogen or one of the above named halogens; and polymers of such monomers and at least one other monoethylenically unsaturated monomer wherein the polymers contain at least about 80 percent by weight

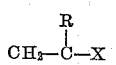

Examples of such monoethylenically unsaturated monomers are the vinyl esters such as vinyl acetate, vinyl propionate, vinyl butyrate, vinyl chloroacetate, vinyl chloropropionate, vinyl benzoate, vinyl chlorobenzoate; acrylic and N-substituted acrylic acids, their alkyl esters, their amides and their nitriles such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, acrylamide, N-methyl acrylamide, N,N-dimethyl acrylamide, acrylonitrile, chloroacrylonitrile, methacrylonitrile, ethacrylonitrile; vinyl aromatic compounds such as styrene, dichlorostyrene, vinyl naphthalene; alkyl esters of maleic and fumaric acid such as dimethyl maleate, diethyl maleate; vinyl alkyl ethers and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone, and the like; also vinyl pyridine, N-vinyl carbozale, N-vinyl pyrrolidine and the like.

Primary stabilizers are those compounds which are capable of reacting with any hydrogen halide, which might split off from the vinyl halide resins, to form the corresponding salt. Illustrative of these compounds, referred to as "hydrogen halide acceptors" are the Group II metal salts of aliphatic fatty acids having from 6 to 21 carbon atoms inclusive. Exemplary of such acids are those which have the formula:

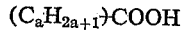

wherein $a$ is an integer having a value of 6 to 20 inclusive, such as caprylic acid, capric acid, lauric acid, myristic acid, palmitic acid, stearic aid and the like; unsaturated acids which have the formula:

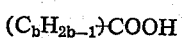

wherein $b$ is an integer having a value of from 6 to 20 inclusive, such as $\Delta^{9,10}$-decylenic acid, $\Delta^{9,10}$-dodecylenic acid, palmitoleic acid, oleic acid, petroselinic acid, vaccenic acid and the like; unsaturated acids which have the formula:

$$(C_dH_{2d-3})COOH$$

wherein $d$ is an integer having a value of from 6 to 20 inclusive, such as linoleic acid and the like. Other suitable primary stabilizers are Group IV metal salts of the acids described previously as well as metal salts of inorganic acids. Group IV metals as set forth in the Handbook of Chemistry and Physics, previously identified, are illustrated by tin and lead. Among such stabilizers can be noted the following: dibasic lead stearate, dibutyl tin laurate, tribasic lead sulfate, dibasic lead phosphate. Also suitable as primary stabilizers are: lead orthosilicate, coprecipitated lead orthosilicate and silica gel, lead salicylate, tribasic lead maleate, dibasic lead carbonate, dibasic lead phthalate, dibutyl tin diacetate, lead hydroxylnaphthenate.

Alkali metal salts of weak acids are also useful as primary stabilizers. These compounds include among others, sodium citrate, potassium citrate and the like. Various sodium organo phosphate compositions known as "Vanstay L" (chemical analysis: 16.61 percent by weight sodium, 8.33 percent by weight phosphorus, 49.12 percent by weight ash) are also suitable as are boron compositions known as "Stabelan A" (chemical analysis: 9.17 percent by weight sodium, 5.21 percent by weight boron, 3.59 percent by weight phosphorus, 7.78 percent by weight calcium, 53.33 percent by weight ash).

Other stabilizers characterized by their ability to react with hydrogen halide liberated in the decomposition of vinyl halide resins include epoxidized soybean oil, epoxidized 2-ethylhexyl tallate, epoxidized pentyl stearate, epoxidized hexyl stearate, epoxidized heptyl stearate, epoxidized octyl stearate, 2-acetoxyethyl-9,10-epoxy-12-acetoxyoctadecanoate, 2 - propionyloxyethyl-9,10-epoxy-11-acetooxyoctadecanoate, diglycidyl ether of 2,2-bis(p-hydroxyphenyl) propane and other such epoxy compounds. Also oxides of Group II metals such as magnesium oxide and the like.

As previously stated, the secondary stabilizers are Group II metal tallates. Among Group II metal tallates can be noted the following: beryllium tallate, magnesium tallate, calcium tallate, zinc tallate, strontium tallate, cadmium tallate and barium tallate.

It is to be understood that mixtures of the vinyl halide resins, mixtures of the primary stabilizers and mixtures of the secondary stabilizers can be used, if so desired.

The compositions of this invention can also contain various other materials such as dyes, pigments, fillers, plasticizers, lubricants, surface-active agents and the like, which are all well-known in the art provided that the resin concentration is in excess of about 60 percent by weight based on the weight of the composition, preferably in excess of about 80 percent by weight.

Preparation of compositions of this invention can be effected by admixing the materials in any suitable apparatus, as for example, a Banbury, a ribbon blender, a Hobart mixer, a paddle blender, an extruder and a Henschel mill. If desired, the primary and/or secondary stabilizers can be added to the resin in the manufacturing unit wherein the resin is produced subsequent to the time at which the production of the resin is effected. The manufacture of molded sound records from the compositions of this invention is described in the examples of this application. It is to be understood, however, that the compositions of this invention can be used in the preparation of laminated sound records as well as molded sound records.

AUDIO TEST

High fidelity reproduction equipment of "professional quality" was used to listen to unplayed and also to wear tested sound records. Amplifier settings were as follows: no bass, full treble, high volume, and flat-unfiltered response. An experienced panel of four people listened to all records tested and rated them qualitatively based on freedom from the subsequently mentioned audio defects. Records were listened to as follows:

(a) Silent lead-in grooves.
(b) Silent cross-over grooves.
(c) Silent lead-out grooves.
(d) Silent lead-out spiral.
(e) Modulated areas near outside, center and inside.

Results reported in the examples with respect to the Audio Test are average values obtained on testing 10 records manufactured from each composition noted, five of which were unplayed and five of which were "wear" tested. "Wear" tested records as used herein refers to records which were played 100 continuous times with a 5 gram head weight.

HEAT STABILITY TEST

Each composition was compounded in a Banbury mixer for 2.5 to 3 minutes to a "drop" temperature of 150° C. Each composition was given 6 end-passes on a two roll mill, which had a surface roll temperature of 160° C. After the sixth end-pass, each composition was allowed to band on the two roll mill and a small specimen then cut from the banded sheet. On cutting the specimen from the banded sheet, the time was designated to be "zero" time. Every consecutive minute starting from "zero" time, the banded sheet was cut and the rolling bank of material pulled through the bit of the two-roll mill in order to insure uniform treatment of each batch of material. The material was again passed into the two-roll mill and allowed to band thereon. Every 5 minute interval starting from "zero" time, the mill was stopped and a small specimen 4 inches by 4 inches was cut from the banded sheet. If the material stuck to the rolls of the mill at any point in the procedure defined above, the test was considered to be at an end. Sticking indicates thermal degradation.

In the following examples, which are illustrative and not intended to limit the scope of the present invention in any manner, amounts are in parts by weight unless otherwise specified.

Example 1

Compositions, whose formulations are noted below, were compounded in a Banbury mixer at a temperature of 150° C. for 2.5 to 3 minutes, given 8 end-passes on a two-roll mill at a temperature of 130° C., sheeted off the two-roll mill, cut into the shape of biscuits and then compression molded into 12 inch diameter stereophonic sound records under a pressure of 1750 p.s.i.g. and at a peak temperature of 150° C.

|  | Amounts | | |
| --- | --- | --- | --- |
|  | Control 1 | Control 2 | A |
| Copolymer of vinyl chloride and vinyl acetate containing 87 percent by weight combined vinyl chloride and 13 percent by weight vinyl acetate | 97.5 | 97.5 | 97.5 |
| Dibasic lead stearate | 1.5 | 0.75 | 0.75 |
| Carbon black | 1.0 | 1.0 | 1.0 |
| Calcium-barium tallate |  |  | 0.75 |
| Epoxidized 2-ethylhexyl tallate |  | 0.75 |  |

Sound records manufactured from Composition A were free from stains and streaks and had a high gloss, jet black appearance.

A rating of the records by means of the Audio Test appears below:

|  | Unplayed | Wear Tested, 100 Plays |
|---|---|---|
| Sound records made from Control 1. | Slight background noises with swishing. | Heavier background noises, swishing and slight distortion. |
| Sound records made from Control 2. | ___do___ | Do. |
| Sound records made from Composition A. | Very slight background noises, no swishing. | No swishing or distortion. |

Calcium-barium tallate noted in this and subsequent examples was a mixture made up of 10 parts by weight calcium tallate per 1 part by weight barium tallate.

A composition was also formulated which was the same as Composition A with the exception that polyvinyl chloride was used in lieu of the copolymer of vinyl chloride and vinyl acetate. Records formed from this composition had substantially the same properties as records formed from Composition A.

*Example II*

This example illustrates the excellent heat stability possessed by the compositions of this invention.

Compositions, whose formulations are noted below, were subjected to the heat stability test previously described.

|  | Amounts | | | | | | | |
|---|---|---|---|---|---|---|---|---|
|  | Control 3 | Control 4 | Control 5 | Control 6 | Control 7 | B | C | D |
| Copolymer of vinyl chloride and vinyl acetate (described in Example I) | 98.5 | 97 | 96 | 93.5 | 98.5 | 96 | 97 | 98.5 |
| Dibasic lead stearate | 1.5 | 3 | 4 | 1.5 | | 2 | 1.5 | 1 |
| Calcium-barium tallate | | | | 5 | 1.5 | 2 | 1.5 | 0.5 |
| Time on mill before sticking occurred (in minutes from zero time) | 24 | 30 | 30 | 5 | 5 | 42 | 40 | 35 |

The data appearing in this example shows that on using more than about 50 percent by weight of a tallate based on the total amount of stabilizer present in the composition, that the thermal stability of the composition is degraded.

*Example III*

This example illustrates the excellent heat stability possessed by the compositions of this invention.

Compositions, whose formulations are noted below, were subjected to the heat stability test previously described.

|  | Amounts | | |
|---|---|---|---|
|  | Control 8 | Control 9 | E |
| Copolymer of vinyl chloride and vinyl acetate (described in Example I) | 98.5 | 98.5 | 98.5 |
| Dibasic lead stearate | 1.5 | 0.75 | 0.75 |
| Calcium-barium tallate | | | 0.75 |
| Epoxidized 2-ethylhexyl tallate | | 0.75 | |
| Time on mill before sticking occurred (in minutes from zero time) | 25 | 18.5 | 27 |

As can be seen from the data of the preceding table the addition of a stabilizer (Control 9, epoxidized 2-ethylhexyl tallate) other than a tallate, as claimed, to a thermoplastic vinyl halide resin composition containing a primary stabilizer such as dibasic lead stearate degrades the thermal stability of the composition. Adding a tallate, as claimed, in amounts previously noted, to a thermoplastic vinyl halide resin composition containing as the primary stabilizer dibasic lead stearate, improves the thermal stability of the compositions.

*Example IV*

This example illustrates the excellent heat stability possessed by the compositions of this invention. Compositions whose formulations are noted below were subjected to the heat stability test previously described.

|  | Amounts | | | | | | | |
|---|---|---|---|---|---|---|---|---|
|  | Control 10 | F | Control 11 | G | Control 12 | H | Control 13 | I |
| Copolymer of vinyl chloride and vinyl acetate (described in Example I) | 98.5 | 98.5 | 98.5 | 98.5 | 98.5 | 98.5 | 98.5 | 98.5 |
| Dibasic lead stearate | 1.5 | 0.75 | | | | | | |
| Barium-lead stearate | | | 1.5 | 0.75 | | | | |
| Mixture of barium-lead stearate and magnesium oxide | | | | | 1.5 | 0.75 | | |
| Calcium stearate | | | | | | | 1.5 | 0.75 |
| Calcium-barium tallate | | 0.75 | | 0.75 | | 0.75 | | 0. |
| Time on mill before sticking occurred (in minutes from zero time) | 25 | 28 | 15 | 20 | 14 | 20 | 18 | 28 |

The barium-lead stearate noted in this example was made up of 65 parts by weight barium stearate per 35 parts by weight lead stearate.

The mixture of barium-lead stearate and magnesium oxide noted in this example was made up of the following components: 80 parts by weight barium-lead stearate per 20 parts by weight magnesium oxide.

*Example V*

This example illustrates the excellent heat stability possessed by the compositions of this invention.

Compositions, whose formulations are noted below were subjected to the heat stability test previously described.

|  | Amounts | | |
|---|---|---|---|
|  | Control 14 | J | K |
| Copolymer of vinyl chloride and vinyl acetate (described in Example I) | 98.5 | 98.5 | 98.5 |
| Dibasic lead stearate | | 0.75 | |
| Barium-lead stearate | 1.5 | | 0.75 |
| Calcium-barium tallate | | 0.75 | 0.75 |
| Time on mill before sticking occurred (in minutes from zero time) | 15 | 28 | 20 |

Example VI

Compositions, whose formulations are noted below were formulated and formed into sound records in a manner identical to that described in Example I.

| | Amounts | | | | | |
|---|---|---|---|---|---|---|
| | Control 15 | Control 16 | L | M | N | O |
| Copolymer of vinyl chloride and vinyl acetate (described in Example I) | 97.5 | 97.5 | 97.5 | 97.5 | 90.0 | 83.0 |
| Polyvinyl chloride have a specific viscosity of 0.120 | | | | | 8.0 | 15.0 |
| Dibasic-lead stearate | 1.5 | | 1.0 | 0.75 | 1.0 | 1.0 |
| Barium-lead stearate | | 1.5 | | | | |
| Calcium-barium tallate | | | 0.5 | 0.75 | 0.5 | 0.5 |
| Barium ricinoleate | | | | | | |
| Carbon black | 1.0 | 1.0 | 1.0 | 1.0 | 0.5 | 0.5 |

Sound records manufactured from compositions L–O were free from stains and streaks and had a high gloss, jet black appearance.

A rating of the records by means of the Audio Test appears below:

| | Initial | Wear Tested-100 Plays |
|---|---|---|
| Sound records made from Control 15. | Slight background noises with crackling. | Heavier background noises, crackling, swishing and slight distortion. |
| Sound records made from Control 16. | do | Do. |
| Sound records made from Composition L. | Very slight background noises, no crackling. | Very slight background noises only. |
| Sound records made from Composition M. | do | Do. |
| Sound records made from Composition N. | do | Do. |
| Sound records made from Composition O. | do | Do. |

Calcium tallate, barium tallate and other Group II metal tallates used singly, effect the same excellent results when used in lieu of the calcium-barium tallate mixture.

What is claimed is:

1. A sound record having its playing surface formed from a composition comprising a vinyl halide resin, a primary stabilizer which acts as a hydrogen halide acceptor and is a material selected from Group II metal salts of acids having a maximum of 21 carbon atoms, Group IV metal salts of acids having a maximum of 21 carbon atoms, Group II metal salts of inorganic acids, Group IV metal salts of inorganic acids, alkali metal salts of weak acids, epoxides, and Group II metal oxides, and as a secondary stabilizer a Group II metal tallate, said stabilizers being present in said composition in an amount of from about 0.15 percent by weight to about 9 percent by weight, based on the weight of said resin and wherein said secondary stabilizer is present in an amount of from about 10 percent by weight to about 50 percent by weight, based on the weight of said stabilizers in said composition.

2. A sound record as defined in claim 1 wherein the vinyl halide resin of said composition is a copolymer of vinyl chloride and vinyl acetate.

3. A sound record as defined in claim 1 wherein the vinyl halide resin of said composition is polyvinyl chloride.

4. A sound record as defined in claim 1 wherein the said primary stabilizer of said composition is a Group IV metal salt of a fatty acid having the formula:

$$(C_aH_{2a+1})COOH$$

wherein $a$ has a value of 6 to 20 inclusive.

5. A sound record as defined in claim 1 wherein the said primary stabilizer of said composition is a Group II metal salt of a fatty acid having the formula:

$$(C_aH_{2a+1})COOH$$

wherein $a$ has a value of 6 to 20 inclusive.

6. A sound record as defined in claim 1 wherein the said primary stabilizer of said composition is a Group II metal oxide.

7. A sound record as defined in claim 1 wherein the said primary stabilizer of said composition is lead stearate.

8. A sound record as defined in claim 1 wherein the said primary stabilizer of said composition is dibasic lead stearate.

9. A sound record as defined in claim 1 wherein the said primary stabilizer of said composition is a mixture of barium stearate and lead stearate.

10. A sound record as defined in claim 1 wherein the said secondary stabilizer of said composition is a mixture of calcium tallate and barium tallate.

References Cited

UNITED STATES PATENTS

| | | | |
|---|---|---|---|
| 1,932,889 | 10/1933 | Groff | 106—1.5 |
| 2,564,646 | 8/1951 | Leistner | 260—45.7 |
| 2,590,059 | 3/1952 | Winkler | 260—45.75 |
| 2,605,244 | 7/1952 | Matlack | 260—23 |
| 2,868,745 | 1/1959 | Canarios | 260—23 |
| 3,132,866 | 5/1964 | Nitti | 274—42 |
| 3,280,063 | 10/1966 | Zawadski et al. | 260—28.5 |

DONALD E. CZAJA, *Primary Examiner.*

LEON J. BERCOVITZ, *Examiner.*

R. A. WHITE, C. B. PRICE, *Assistant Examiners.*